United States Patent [19]
Kikuchi

[11] Patent Number: 5,255,115
[45] Date of Patent: Oct. 19, 1993

[54] OPTICAL SCANNING APPARATUS AND RECORDING APPARATUS USING THE SAME

[75] Inventor: Kazuo Kikuchi, Hitachi, Japan
[73] Assignee: Hitachi, Ltd., Tokyo, Japan
[21] Appl. No.: 853,425
[22] Filed: Mar. 18, 1992

[30] Foreign Application Priority Data

Mar. 18, 1991 [JP] Japan ................... 3-052135

[51] Int. Cl.⁵ ............................................ G02B 26/08
[52] U.S. Cl. .................................... 359/209; 359/211; 346/108
[58] Field of Search ............... 359/196, 205, 209, 211, 359/557, 707, 708, 831; 346/108, 160, 160.1; 250/234, 235, 236

[56] References Cited

U.S. PATENT DOCUMENTS

| | | | |
|---|---|---|---|
| 3,511,551 | 5/1970 | Matulka | 359/209 |
| 3,617,106 | 11/1971 | Bjork | 359/211 |
| 3,871,750 | 3/1975 | Mecklenborg | 359/196 |
| 4,319,807 | 3/1982 | Horton | 359/211 |
| 4,768,184 | 8/1988 | Reno | 359/211 |
| 4,850,686 | 7/1989 | Morimoto et al. | 359/196 |
| 4,900,120 | 2/1990 | Caviglia et al. | |

FOREIGN PATENT DOCUMENTS 52-84748 7/1977 Japan.
57-144517 9/1982 Japan.

*Primary Examiner*—Loha Ben
*Attorney, Agent, or Firm*—Antonelli, Terry, Stout & Kraus

[57] ABSTRACT

There is disclosed an optical scanning system in which axis alignment in a subscanning direction and adjustment of a spot is easily performed, the spot diameter is variable and a change in efficiency of an optical path due to these changes is small. The optical scanning system comprises two flat plate glasses which are provided between a cylindrical lens for converging an optical beam in a subscanning direction and a polygon mirror and are rotatable around an axis perpendicular to the subscanning direction and may be fixed after an adjustment. Axis alignment in a subscanning direction is obtainable by adjustment of the angle of one flat plate glass, and change in the spot diameter is obtainable by rotating two flat plate glasses in opposite directions while change of the axis in the subscanning direction and change in efficiency of the optical path are kept small.

20 Claims, 7 Drawing Sheets

OPTICAL SCANNING APPARATUS AND RECORDING APPARATUS USING THE SAME

BACKGROUND OF THE INVENTION

1. Field of the Invention

The present invention relates to an optical scanning apparatus for scanning a surface with a deflected optical beam, such as a laser light, and to a recording apparatus using the optical scanning apparatus.

2. Description of the Related Arts

Optical scanners for scanning a surface in two dimensional directions with a spot of light formed on the surface from a repetitively deflected optical beam such as a laser have been widely used in printers such as laser printers.

A polygon mirror or a galvanomirror is usually used as deflecting means of the optical scanner. In the deflecting means, an error of the position of a scanning line readily occurs due to a leaning error of the reflecting surface. In order to correct such an error, a cylindrical lens for converging an incident beam once in a subscanning direction to focus in the vicinity of the reflecting surface of the deflecting means is provided to give a conjugate relationship between the reflecting surface and the scanned surface (i.e. a recording surface).

The optical system of such an optical scanning apparatus should be capable of moving the cylindrical lens in an optical axis direction in order to absorb manufacturing errors of the lenses and the housing so as to converge the optical beam to form the spot precisely on the scanned surface, to absorb the variations in astigmatism in case where a semiconductor laser is used, or to adjust the spot diameter in the subscanning direction.

An approach to move the cylindrical lens in the subscanning direction has been known for adjusting the axes of the cylindrical lens and the optical system in the subscanning direction.

It has been demanded that the recording apparatus using the optical scanning apparatus has a capability of changing the recording density at need. It is necessary that the effective diameter of a spot of the optical beam formed on a recording surface can be changed to an optimum value for video recording in order to maintain the best quality of the recorded video image without spaces between recording spots when the recording density is changed. It is possible to adjust the recording spot size in the main scanning direction by changing the modulation (switching) time of the optical beam. Accordingly, it is common that the optical system is arranged so that only the diameter of the spot in the subscanning direction is variable. An approach of changing the spot diameter in the subscanning direction may be an approach of changing power of the cylindrical lens, an approach of adjusting an opening diameter of an aperture to change the spot diameter of the optical beam incident upon the cylindrical lens, and an approach of intentionally defocusing the spot in the subscanning direction. An arrangement for adjusting a cylindrical lens as the third approach is disclosed in JP-A-57-144517.

Such an optical system is a so-called toric lens system in which the powers in the main scanning direction and in the subscanning direction are different from each other. Therefore, the axes of a plurality of lenses should be aligned with a high precision. It is generally necessary to carry out rotation of the lenses around the optical axis with a high precision. Particularly, since the cylindrical lenses are small in size and a space for mounting the lenses is narrow, the precision required for mounting them is considerably high. In other words, an extremely fine alignment around the optical axis is required for the cylindrical lenses. Therefore, an adjusting and holding mechanism with a high precision is needed for adjusting the cylindrical lenses in the optical axis to change the spot diameter or for adjusting the cylindrical lenses to align the axes in the scanning directions.

The approach to change power of cylindrical lenses requires lens exchange or cylindrical lenses as zoom lenses which the zooming in one direction. The former approach to exchange the lenses requires readjustment on exchange and the latter requires an expensive zoom lens mechanism.

Although the approach to adjust the diameter of the incident optical beam has an advantage that the geometrical shape of the image is not changed, the approach has a defect that the efficiency of the optical path changes according to change in diameter of the beam. In case a semiconductor laser is used as the light source, there is a problem that the amount of change in the efficiency of the optical path or in the spot diameter is not constant due to variations of the emission angle of the semiconductor laser.

Takaoka et al. disclose in JP-A-52-84748 a method of finely adjusting position of convergence of a laser light by controlling an effective thickness of flat plate glasses combined with wedge type prisms. This method cannot adjust the optical axis.

Caviglia et al. and in U.S. Pat. No. 4,900,120 disclose a coupling device for adjusting direction of an optical axis of a collimated optical beam by rotation of flat plate glasses but they do not consider the adjustment of the focal position.

Morimoto et al. in U.S. Pat. No. 4,850,686 disclose a method of adjusting the axis of light rays by the combination of prisms rather than flat plate glasses. The spot size cannot be adjusted by Morimoto method.

SUMMARY OF THE INVENTION

It is therefore an object of the present invention to provide an optical scanning apparatus having a simple structure including an optical system in which axis alignment in the subscanning direction and spot adjustment are easy and in which the spot diameter is variable and a change in efficiency of the optical path due to these changes is considerably low.

The optical scanning apparatus of the present invention having a cylindrical lens and deflecting means is characterized in that a plurality of light transmitting flat plates are disposed between the cylindrical lens and the deflecting means and the flat plates are supported so that the inclination of the flat plates relative to an optical beam is changeable in a subscanning direction in which the cylindrical lens has a power.

The flat plates in the optical scanning apparatus of the present invention will give no influence to a collimated optical beam emitted from a light source in the main scanning direction in which the cylindrical lens has no power.

The system functions in the subscanning direction as follows: a main light ray shifts in parallel by a distance $\delta_1$ by a first flat plate which is inclined by an angle $\theta_1$ relative to a perpendicular plane to the optical axis and then shifts by a distance $\delta_2$ in the opposite direction by a second flat plate which is inclined by an angle $\theta2$ to the perpendicular plane in a direction opposite to the first flat plate. Accordingly, rotating either of the flat plates or rotating both of the flat plates by $\theta1$ and $\theta2$ in opposite direction provides fine adjustment or alignment of the optical axis. In case where no alignment of axes is necessary, rotation of both flat plates by equal angles in opposite directions gives the optical axis no shift during an adjustment which will be described hereinafter.

The parallel movement of an incident light ray when it transmits through a flat plate glass increases as its incident angle increases. Since the optical beam is a converged light having distribution of incident angles, the imaged spot has a distribution and focuses far away by a distance $\delta z$ in the axial direction by the effect of the flat plate glasses. The distance $\delta z$ increases as the inclinations $\theta1$ and $\theta2$ of the flat plates increase. This causes the imaging point of a scanning lens to move backward by $\delta z'$. The position of the cylindrical lens is preliminarily set so that the imaging point is slightly frontward from the former position. Thus, the flat plates may be inclined by $\theta1$ and $\theta2$ to perform focussing in the subscanning direction. If the amount of movement of the imaging point $\delta z'$ is increased by further inclinations $\theta1$ and $\theta2$, the spot diameter in the subscanning direction is resultantly enlarged. The shift of the light beam changes in a substantially linear relation to the inclination of the flat plate while the inclination is small. Accordingly, if adjustment of the spot and change of the spot diameter are performed by inclining both flat plates after the axis alignment has been achieved by inclining either one of the flat plates, the shift of the optical axis in the subscanning direction at the imaging point of the cylindrical lens is small.

Adjustment and change of the spot diameter will be described with reference to FIGS. 1 and 2. In an optical system shown in FIG. 1, an optical beam which is a collimated laser light is converged in a subscanning direction (the vertical direction in parallel to the paper in FIG. 1) by a cylindrical lens 103 and is imaged with a distribution in a line in the vicinity of reflection surfaces of a polygon mirror (not shown). An imaging lens system comprising first and second lenses 131 and 132 converges the optical beam reflected on the polygon mirror and incident upon a scanned surface so as to form a small spot on the surface and converts a constant angular velocity scanning achieved by the polygon mirror into a constant speed scanning. Parallel flat plate glasses 110a and 110b each having opposite sides applied with anti-reflection coating are disposed between the cylindrical lens 103 and the polygon mirror for shifting the optical axis while reducing the loss of the optical beam transmitting therethrough.

In such an optical system, the flat plates in the optical scanning apparatus of the present invention will give no influence to a collimated optical beam emitted from a light source in the main scanning direction (the perpendicular direction to the paper in FIG. 1) in which the cylindrical lens has no power.

The system functions in the subscanning direction as follows. A main light ray will now be considered. The main light ray is shifted in parallel by $\delta1$ by the first flat plate 110a which is inclined by $\theta1$ relative to a perpendicular plane to the optical axis and then shifted by $\delta2$ in the opposite direction by the second flat plate 110b which is inclined by $\theta2$ in a direction opposite to the first flat plate 110a relative to the perpendicular plane. Accordingly, by rotating either of the flat plates 110a and 110b or rotating the flat plates by $\theta1$ and $\theta2$ in opposite direction, fine adjustment or alignment of the optical axis is possible. In case where no alignment of axes is necessary, rotation of both flat plates 110a and 110b by equal angles keeps the optical axis with no shift during an adjustment which will be described hereinafter.

Since the optical beam is a converged light, the imaging point is moved backward by $\delta z$ due to the inclinations $\theta1$ and $\theta2$ of the flat plate glasses 110a and 110b. This causes the imaging point of a imaging lens to move backward by $\delta z'$. The position of the cylindrical lens 103 is preliminarily set so that the imaging point is slightly frontward to the former position. Thus, the flat plates 110a and 110b may be inclined by $\theta1$ and $\theta2$ to perform moving the imaging point in the subscanning direction. If the amount of movement of the imaging point $\delta z'$ is increased by further inclinations $\theta1$ and $\theta2$, the spot diameter in the subscanning direction is resultantly enlarged. The relation between the shift of the light beam and the inclination of the flat plate is substantially linear while the inclination is small as shown in FIG. 2. Accordingly, if the adjustment of the spot and change of the spot diameter are performed by inclining both flat plates 110a and 110b by the same angles after the axis alignment has been achieved by inclining either one of the flat plates, the shift of the optical axis in the subscanning direction at the imaging point of the cylindrical lens is kept in small while the inclination is small.

DESCRIPTION OF THE PREFERRED EMBODIMENTS

Embodiments of the present invention will be described with reference to the attached drawings.

Figure 1:
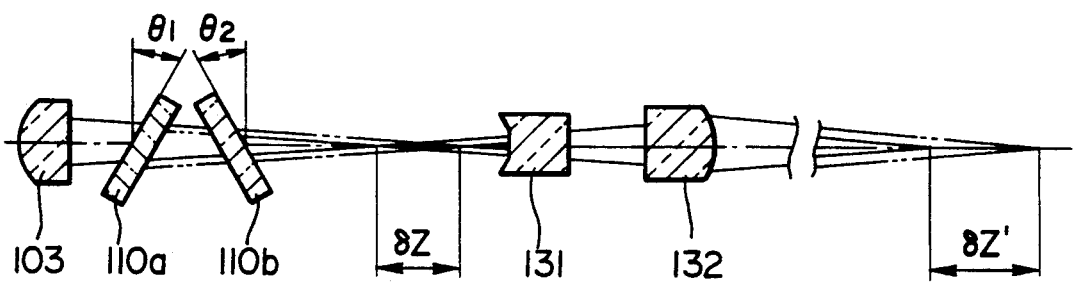
FIG. 1 is a conceptional view of an optical system for illustrating the basic structure of the present invention.
Figure 2:
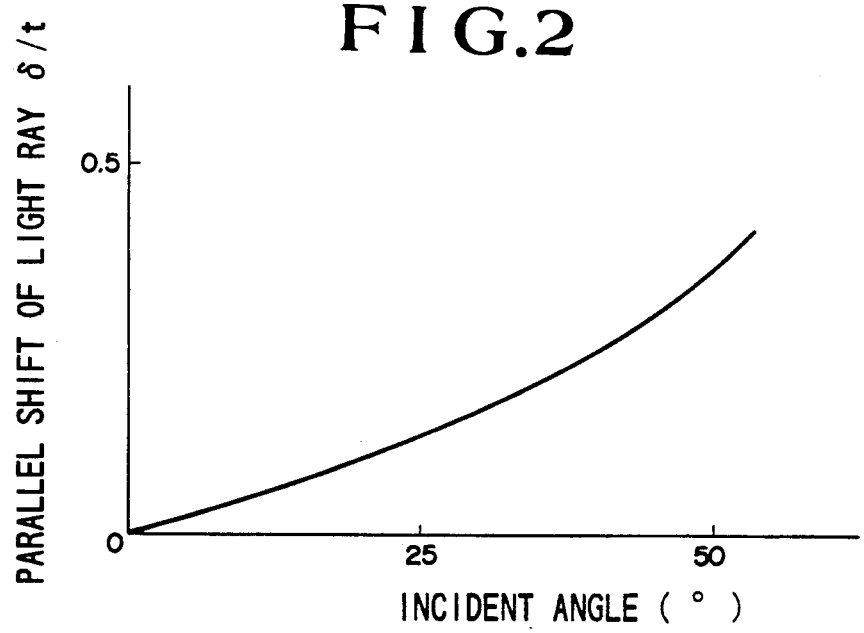
FIG. 2 is a graph showing the relation between the incidence angle and the parallel shift of an optical beam transmitting through a flat plate.
Figure 2:
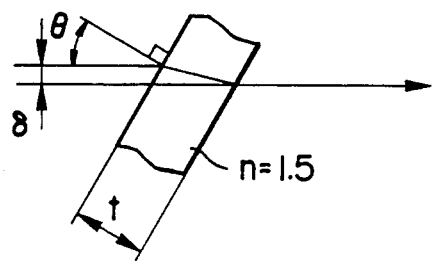
Figure 3:
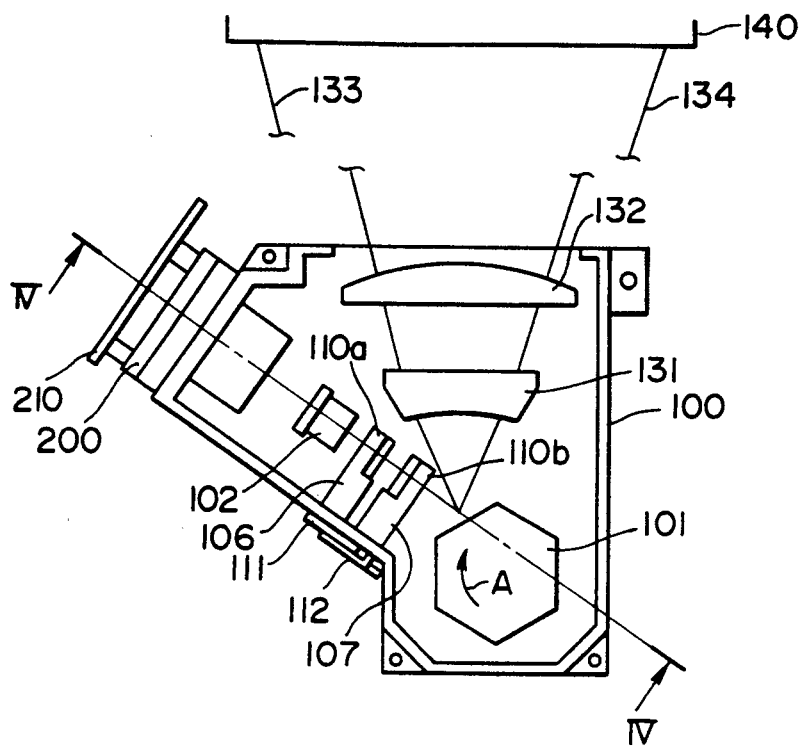
FIG. 3 is a plan showing an optical scanning apparatus of the present invention.
Figure 4:
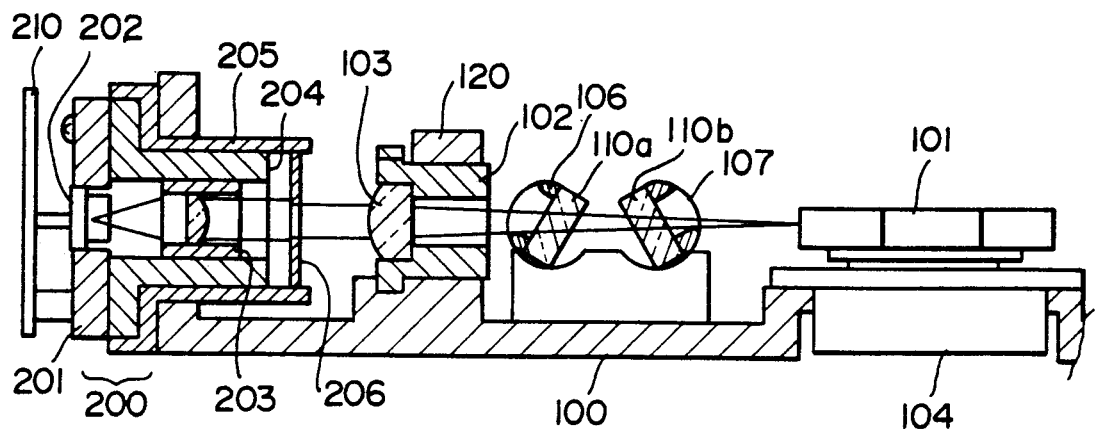
FIG. 4 is a sectional view taken along the line IV—IV in FIG. 3.
Figure 5:
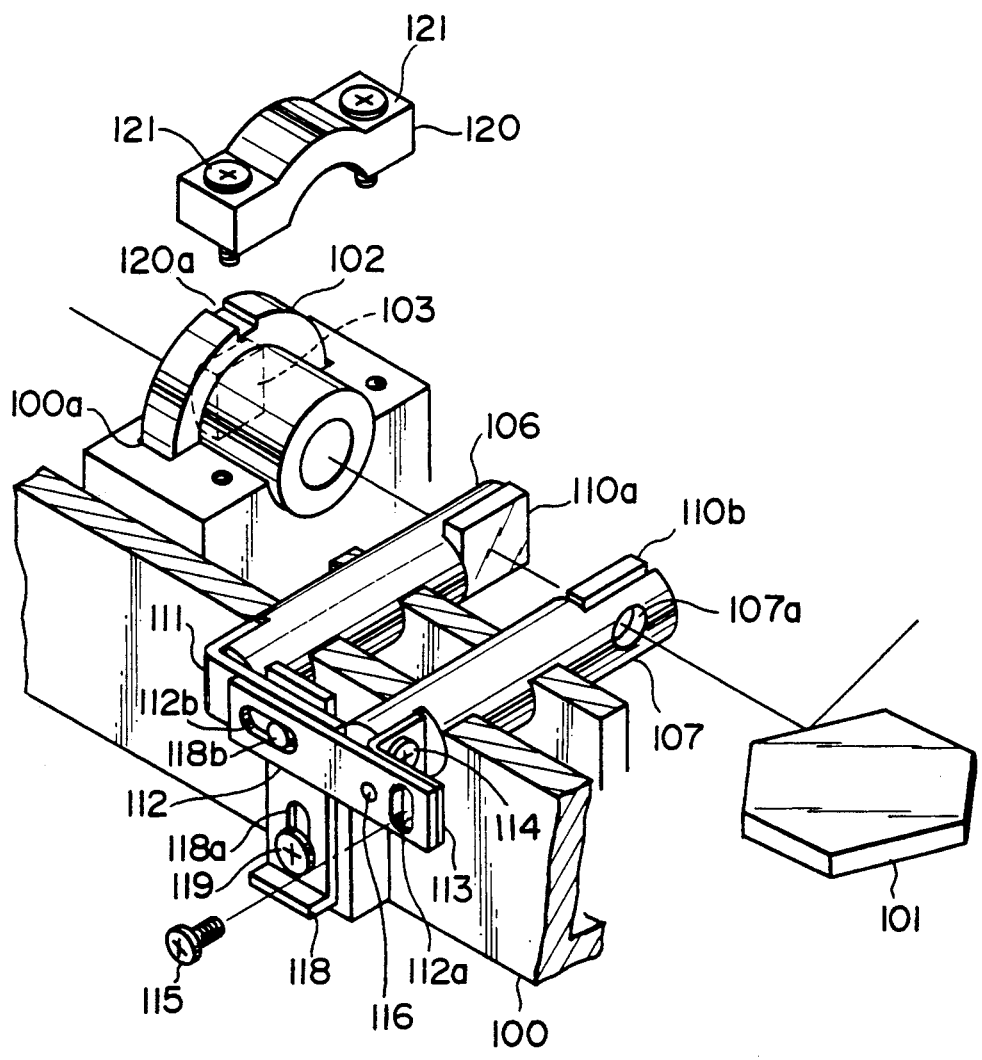
FIG. 5 is a perspective view showing a main part of the optical scanning apparatus.

FIGS. 3, 4 and 5 show a first embodiment of the present invention. FIG. 3 shows a plan of an optical scanning apparatus, FIG. 4 shows a sectional view taken along the line IV—IV in FIG. 3, and FIG. 5 shows the detail of a section from a cylindrical lens to a polygon mirror.

An optical beam which is a collimated laser light generated from a laser unit 200 is converged in a subscanning direction (a vertical direction in parallel with the paper plane in FIG. 4) by a cylindrical lens 103 and is imaged in a line in the vicinity of a reflection surface of a polygon mirror 101. The polygon mirror 101 is mounted on a rotary shaft of a scanner motor 104 and is rotated at a constant speed in a direction of an arrow A for deflecting the optical beam. An imaging lens system comprises first and second lenses 131 and 132 and converges the optical beam so that a small spot is formed on a surface 140 to be scanned and converts a constant angular speed scanning performed by the polygon mirror 101 into a constant speed scanning. Flat plate glasses 110a and 110b which are mounted on glass holding rods 106 and 107, respectively, are disposed between the cylindrical lens 103 and the polygon mirror 101. An anti-reflection coating is applied upon both sides of the flat plate glasses 110a and 110b. The respective components are mounted on a housing 100 with a predetermined positional relation and necessary precision.

A semiconductor laser 202 is mounted on a laser mounting plate 201 screwed on a lens holder 204 in the laser unit 200. A collimator 203 is held on and secured to the lens holder 204 after being adjusted so that an emitted light is collimated. The lens holder 204 is provided on the outer side thereof with a protection cover 205 which also serves as an electrical insulator. The cover 205 holds an aperture 206 with its opening coaxial with the collimator 203 so that the diameter of the optical beam which is incident upon the cylindrical lens 103 is maintained constant. The cylindrical lens 103 is mounted on a holder 102, which is in turn mounted on the housing 100. A drive circuit 210 is connected with the semiconductor laser 202.

As illustrated in FIG. 5 in detail, the holder 102 which holds the cylindrical lens 103 includes a flange having a notch 102a on a part thereof and is rotatable around an optical path while the position of the holder 102 in a direction of the optical axis is held constant by fitting the flange into a recess 100a formed on a part of the housing 100. The flange is positively secured to the housing in a downward direction by a press plate 120 and set screws 121a and 121b therethrough. Adjustment of the rotational angle of the cylindrical lens 103 around the optical axis is carried out by applying a rotational force upon the notch 102a while the set screws 121a and 121b are loosely screwed. Although the rotational angle of the cylindrical lens 103 around the optical axis is adjusted according to the present embodiment, adjustment of the angle may be eliminated due to a careful design of lenses, mounting structure or overall optical system.

A lever 111 is secured to one end of the glass holder 106. A lever 112 is secured to one end of the glass holder 107 via a fitting 113. The lever 112 is rotatable around a pin 116 of the fitting 113 so that the linking angle between the lever 112 and the fitting 113 is adjustable within a range of an elongated hole 112a formed on the lever 112. The lever 112 and the fitting 113 are secured by a screw 115 after completion of adjustment. The levers 111 and 112 are provided with elongated holes 112b and are engaged with a pin 118b provided on an adjusting plate 118. The adjusting plate 118 is secured to the housing 100 by a screw 119 which passes through the elongated hole 118a so that the plate 118 can move in upward and downward directions. When the pin 118b is moved downward, the levers 111 and 112 are pulled downward and the glass holders 106 and 107 are rotated around respective axes in opposite directions.

Adjustment is performed in the present embodiment as follows: the flat plate glasses 110a and 110b are disposed so that they are perpendicular to the optical axis when the adjusting plate 118 is positioned in the uppermost position; alignment of axes in the subscanning direction is performed by rotating the glass holder 107 while the adjusting plate 118 is in the uppermost position and the lever 112 is secured to the fitting 113 by a screw 115; and then, adjustment of the spot diameter in the subscanning direction on the scanned surface 140 is performed by finely moving the adjusting plate 118 in a downward direction. This completes the adjustment to provide the minimum spot diameter. In case where the spot diameter is increased to change the recording density, an operator may unscrew the screw 119, move the adjusting plate 118 to a lower appropriate position and fasten the plate 118 again by the screw 119.

In the present embodiment, axis alignment in the subscanning direction may be performed in an independent and easy manner. Adjustment of changing (increasing or decreasing) the spot in size can be performed only by a simple operation such as rotation of two flat plate glasses 110a and 110b. A change in transmission factor due to the change in an incident angle of the light beam upon flat plate glasses 110a and 110b can be suppressed to the minimum value.

Figure 6:
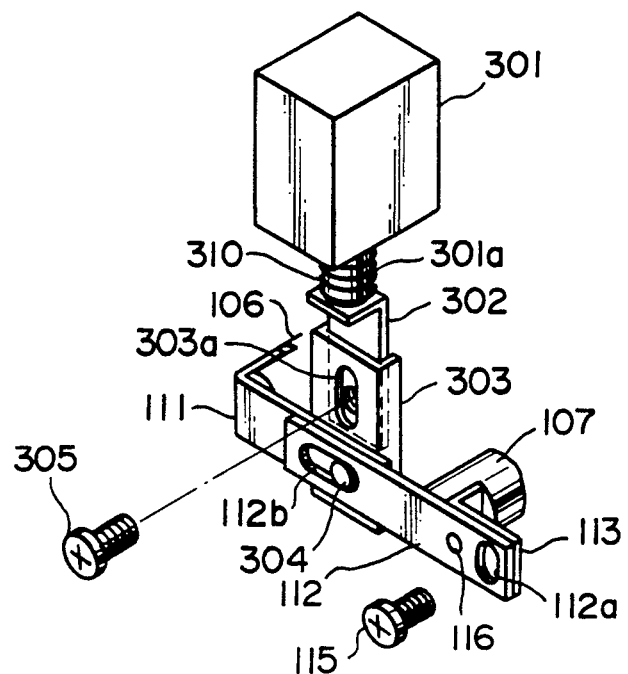
FIG. 6 is a perspective view showing a main part of another embodiment.

FIG. 6 shows another embodiment which is substantially identical with the first embodiment except a mechanism for achieving rotation of the flat plates glasses 110a and 110b. Description of the identical components is omitted herein.

Operation for changing the spot diameter is performed by an electromagnetic solenoid in the present embodiment. A movable plate 302 is mounted on a plunger 301a of the electromagnetic solenoid 301 and is movable in an upward and a downward direction. The plunger 301a is extended by a spring 310. A coupling plate 303 is used in lieu of the adjusting plate 118 in the above mentioned first embodiment. A pin 304 which is provided on the coupling plate 303 is engaged with elongated holes 112b of the levers 111 and 112 and the coupling plate 303 is secured to the movable plate 302 by an adjusting screw 305 passing through an elongated hole 303a.

Axis alignment in the subscanning direction in the present embodiment is identical with that of the above mentioned first embodiment. Adjustment of the spot diameter in the subscanning direction is performed by unscrewing the screw 305 to bring the screw into semisecured state for adjusting the relative position of the coupling plate 303 with respect to the movable plate 302.

The spot diameter is changed by switching the drive current of the electromagnetic solenoid 301. When the electromagnetic solenoid 301 is deenergized, the plunger 301a is biased downward by a spring 310 to the lowermost position. When the solenoid 301 is energized, the plunger 301a is biased upward against the spring 310 to the uppermost position. This causes the lever 111 and the flat glass plate 110a to rotate counterclockwise and the lever 112 and the flat plate glass 110b to rotate clockwise so that the flat plate glasses 110a and 110b are inclined in directions opposite to those in the first embodiment.

In the present embodiment using the electromagnetic solenoid 301, the spot diameter is selected between a large and a small diameter. It is possible to change the diameter in response to an electrical signal. A system for detecting the angle of the flat plate glass may be omitted by preliminarily setting a required moving range. The spot diameter can be easily changed while an optical scanning apparatus is incorporated in an instrument such as a printer.

Figure 7:
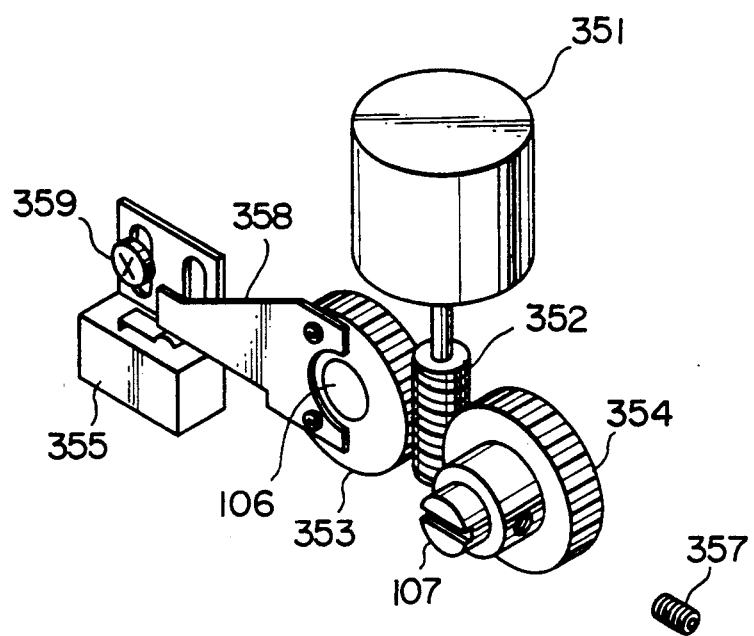
FIG. 7 is a perspective view showing a main part of a further embodiment.

FIG. 7 shows a further embodiment in which a motor 351 rotates the flat plate glasses. Description of components common to those in the above mentioned embodiments will be omitted herein. Worm wheels 353 and 354 are secured to the ends of the shafts of the glass holders 106 and 107, respectively. A worm 352 mounted on a rotary shaft of the motor 351 is meshed with the worm wheels 353 and 354. A reference point for the absolute angle of the flat plate glass secured to the glass holder 106 is detected by the actuation of a limit switch 355 caused by an arm 358 mounted on the worm wheel 353. The reference point is adjusted by unscrewing a screw 359 to adjust the fixing position in which the limit switch 355 is secured by a screw 359 passing through an elongated hole of a mounting plate.

Securing of the worm wheel 354 to the shaft end of the glass holder 107 is carried out by a setscrew 357 after the relative angle of the flat plate glass 110a is adjusted to the flat plate glass 110b by adjusting the relative angle of the worm wheel 354 to the glass holder 107. The axial alignment in the subscanning direction is carried out in such a manner.

Since it will suffice to operate the motor 351 to adjust the spot or to change the spot diameter in the present embodiment, the control will be obtained easier. Since the spot diameter can be continuously changed, the applicability is enhanced.

Figure 8:
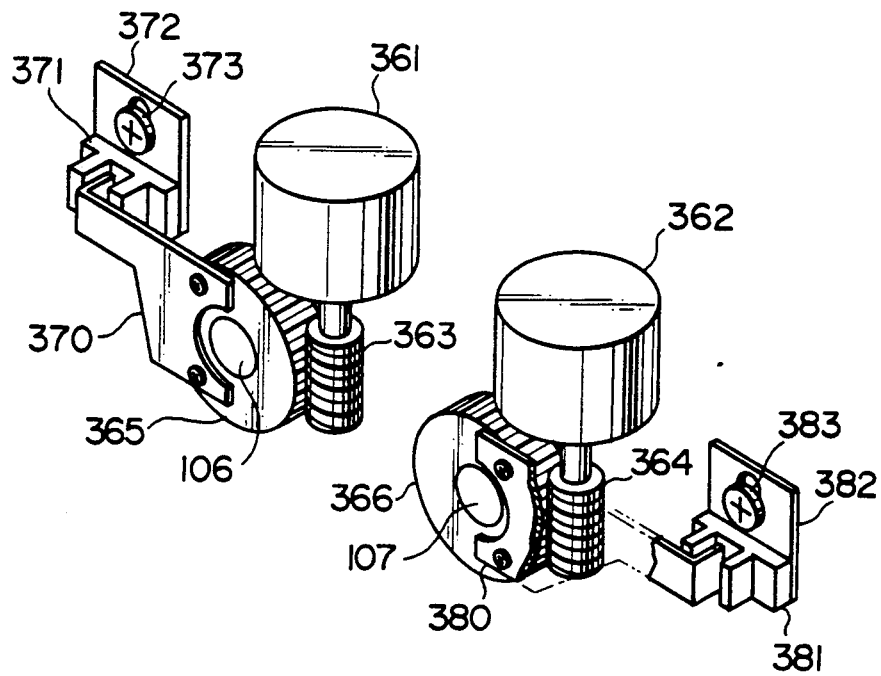
FIG. 8 is a perspective view showing a main part of a still further embodiment.

FIG. 8 shows a further embodiment. In this embodiment, worm wheels 365 and 366 are secured to the glass holders 106 and 107, respectively, and are meshed with worms 363 and 364 mounted on rotary shafts of motors 361 and 362, respectively. Arms 370 and 380 secured to the worm wheels 365 and 366 respectively act on photointerrupters 371 and 381 for detecting the inclination angles of the flat plate glasses 110a and 110b, respectively. The mounting plates 372 and 382 of the photointerrupter 371 and 381 are provided with elongated holes. The mounting plates 372 and 382 are mounted by setscrews 373 and 383, respectively. This makes it possible to set references of the inclination angles of the flat plate glasses 110a and 110b and to adjust axis alignment. Although two motors are necessary in the present embodiment, the inclination angle of each of the first plate glasses 110a and 110b can be independently changed for adjusting or changing the spot diameter as mentioned above.

Means for detecting the flat plate glasses 110a and 110b may comprise known electrical, magnetic or mechanical sensors other than those which have been described with reference to FIGS. 7 and 8. Use of stepping motors as the motors 351, 361 and 362 in the embodiments shown in FIGS. 7 and 8 makes it possible to form a control apparatus comparatively easily.

Although the above mentioned embodiments are explained to perform both of the rotation adjustment of the cylindrical lens around the optical axis and the axis alignment in the subscanning direction, they are similarly applicable to a structure in which either or both of the adjustment and the axis alignment is unnecessary. In case where the axis alignment in the subscanning direction is unnecessary, it suffices to omit the lever 112 and fitting 113 but to use a component having a shape similar to that of the lever 111. This is the same in embodiments which will be described hereinafter. This is the same in cases where a component such as a mirror having a similar function is used in lieu of the cylindrical lens and where the configuration of the imaging optical system in the apparatus is changed. Although the embodiments in which the axis of the rotation of the flat plate glass is perpendicular to the subscanning direction have been described, it is apparent that similar effects are obtained irrespective of the direction of the axis of the rotation if the angular component may change in the subscanning direction.

Though it suffices to secure the flat plate glasses to the glass holders, the flat plate portions, support portions and axial portions may be formed in a single body of optical plastics to further simplify the structure. Two flat plate glasses may be different therebetween in thickness or refractive index. In this case, an approximate effect can be obtained by changing the length of the lever to provide different rotational angles or by changing the rotation of the motors.

Figure 9:
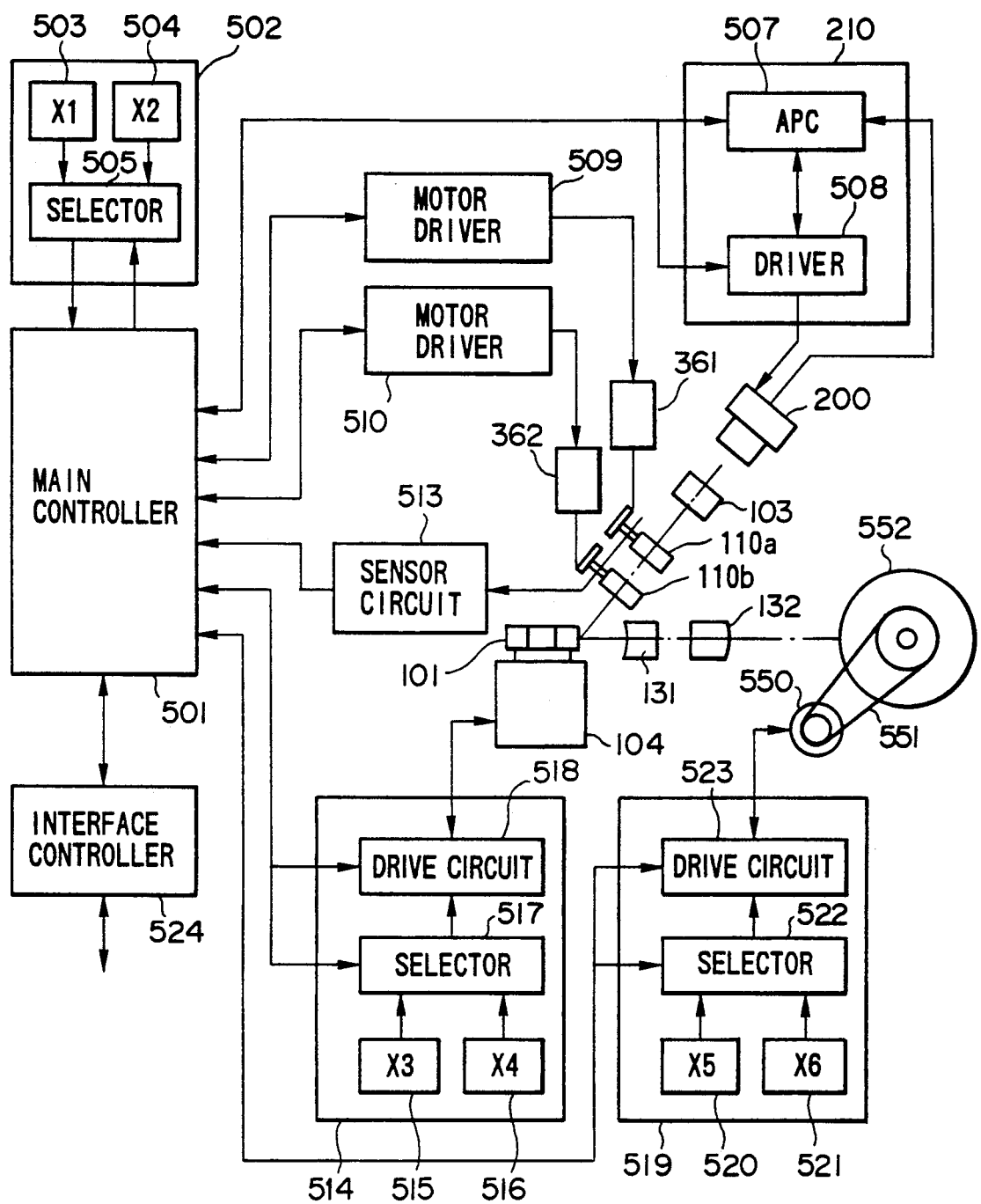
FIG. 9 is a block diagram showing a control apparatus in a laser printer of the invention.

An embodiment of a recording apparatus to which the optical scanning apparatus of the present invention is applied will be described. The recording apparatus is a laser printer in which the recording density can be switched to select one from two densities such as normal and high densities. Its block diagram is shown in FIG. 9.

A photosensitive drum 552 is driven to rotate via a belt 551 by a main motor 550 and is exposed to images by the above mentioned optical scanning apparatus for performing video image recording. In the laser printer using the xerography, the photosensitive drum 552 is uniformly charged by a charging device and is exposed to an image to form an electrostatic latent image by the optical scanning apparatus. The electrostatic latent image is developed to provide a toner image, which is then transferred and fixed to a recording paper and the paper which bear the toner image is discharged.

A semiconductor laser within the laser unit 200 is controlled by a laser control circuit 210 to modulate the quantity of light or to switch the light. The laser control circuit 210 comprises an APC circuit (a light quantity control circuit) 507 for controlling the quantity of light and a driver circuit 508 for performing switching modulation. The optical beam having a given quantity of light is switching modulated under control of the main controller 501 in accordance with data to be recorded.

A main motor controller 519 which controls the rotation of the main motor 550 comprises two oscillators 520 and 521 which oscillate at different frequencies. One of the outputs from the oscillators 520 and 521 is selected and is supplied to a drive circuit 523 as a reference signal. The main controller 501 sends control signals for controlling the selector 522 and the drive circuit 523 so as to preset the rotational speed and perform the operation and termination of the apparatus and monitoring of abnormalities.

A scanner controller 514 which controls a scanner motor 104 for rotating a polygon mirror 101 comprises two oscillators 515, 516, a selector 517 and a drive circuit 518 similarly to the main motor controller 519. Presetting of the rotational speed, operation, stopping, monitoring of abnormalities is controlled by the main controller 501.

In the present embodiment, operation for changing the inclination angles of the flat plate glasses 110a and 110b is carried out by the two stepping motors 361 and 362, respectively, as is described with reference to FIG.

8. The stepping motors 361 and 362 are controlled by the motor drivers 509 and 510, respectively. An output signal from a sensor which detects the reference position is supplied to the main controller 501.

A video clock oscillating circuit 502 which supplies the main controller 501 with video clock signals or reference signals for timing the operation of video imaging or recording comprises two oscillators 503 and 504 which oscillate at different frequencies and a selector 505 and is controlled to select one of the frequencies in response to a control signal from the main controller 501 for outputting a clock having the selected frequency.

An interface controller 524 which is connected with the main controller 501 controls communication with a host apparatus and flow of recording information.

Low density recording is carried out in normal mode in the present embodiment and high density recording is selectable when necessary. Since the frequency of the video clock increases in proportion to the square of recording density, the uppermost of the video clock is often limited by the operation speed of circuit elements or of the host apparatus. Therefore, depending upon the kind of the recording information and the purpose of recording, the recording speed or density is changed. Low density recordings are performed if high speed recordings are needed, and vice versa. It is necessary to lower the quantity of light of an optical beam (optical output of the semiconductor laser) in case of low speed recording than that in case of high speed recording. Although the spot diameter changes in two steps in the present embodiment, the apparatus may be constructed to perform recording with spots of a changeable diameter while the recording speed and video clock are kept constant.

Figure 10:
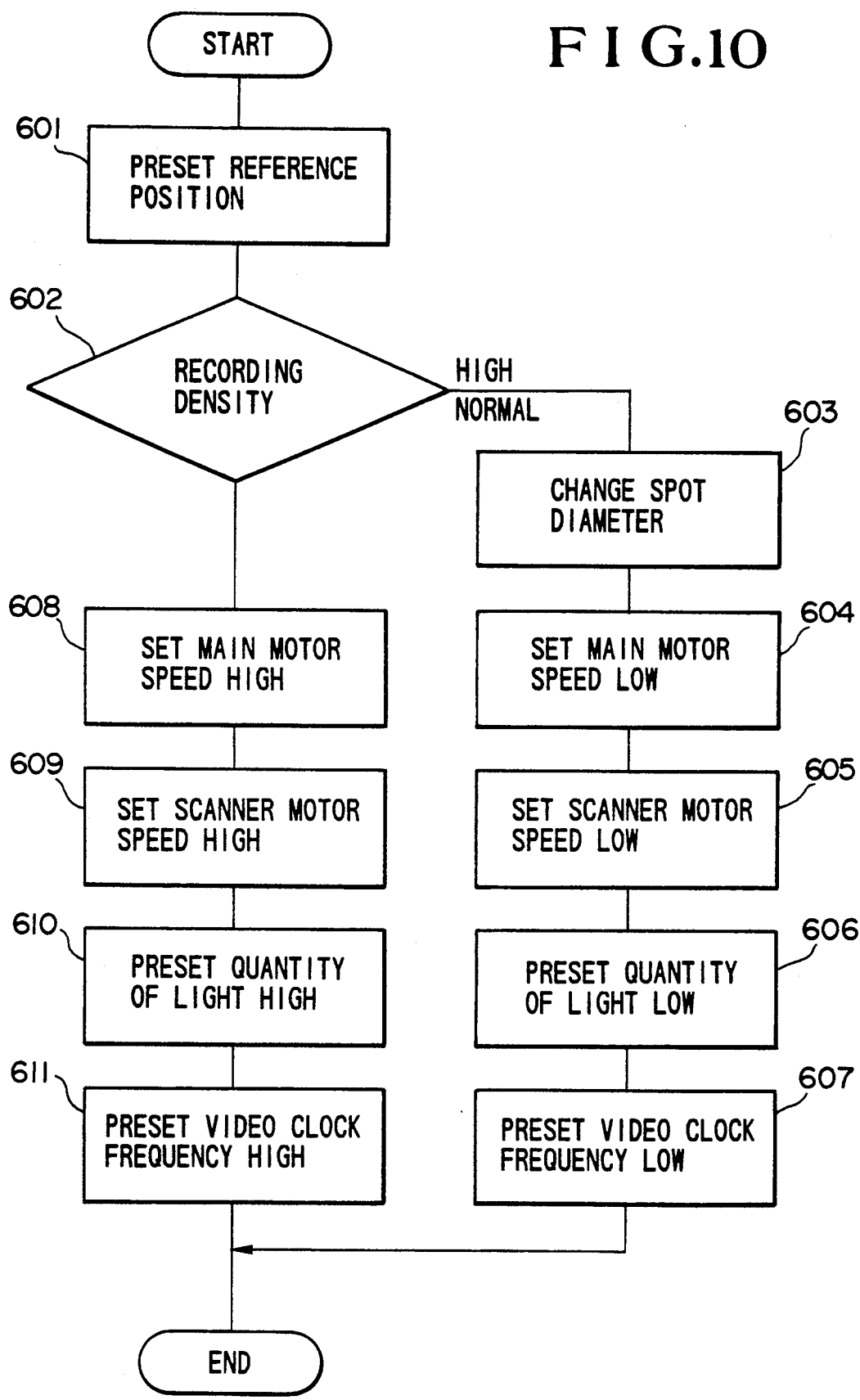
FIG. 10 is a flow chart showing a control process executed by a main controller of the control apparatus.

FIG. 10 is a flow chart for a control processing which is executed by the main controller 501 for controlling change of the recording density.

In step 601, the stepping motors 361 and 362 are rotated for presetting the flat plate glasses 110a and 110b at the reference positions and thus the inclination angles of the flat plate glasses 110a and 110b are preset in positions in which detection signals are obtained from the sensors 513 (e.i. photointerruptors 371 and 381).

Selection of either one of high and low recording densities is then made in step 602. In case the high density recording is selected, the program step will proceed to step 603, in which the stepping motors 361 and 362 are rotated to reduce the spot diameter Thereafter, selection signal of the selector 522 is controlled to lower the rotational speed of the main motor 550 (step 604). Selection signal of the selector 517 is controlled to lower the rotational speed of the scanner motor 104 (step 605). An APC circuit 507 is controlled to decrease the quantity of laser light (step 606). The selector 505 is controlled to select the video clock having the low frequency adapting to the selected recording density (step 607). Operation for changing the recording density is completed.

After completion of such a processing for changing the recording density, switching control of the laser beam is executed in accordance with the video signal similarly to conventional printer.

By changing the structure of the actuator for rotating the flat plate glasses 110a and 110b, and/or increasing the number of the oscillators to increase the number of frequencies of the clock signal, the optical scanning apparatus may adapt to three or more recording densities and/or recording speeds. By combination of recording speed with clock frequency, it is possible to change the recording density in a main scanning direction (optical scanning direction) independently of that in a subscanning direction (in a direction to which the photosensitive drum is moved). Thus it is possible to easily preset the appropriate spot diameter under each condition.

In accordance with the present invention, axis alignment in a subscanning direction and adjustment of spot are easy and the spot diameter is variable as mentioned above. An optical scanning system in which a change in efficiency of optical path due to the change in spot diameter and the alignment is remarkably low can be embodied. Since light transmitting flat plates are used, sensitivity of adjustment is low and the sensitivity can be selected by changing the thickness and/or refraction index of the flat plates. Since high precision is not required for the arrangement of the flat plates, production efficiency is enhanced.

I claim:

1. An optical scanning apparatus, comprising:
   light source means for emitting an optical beam;
   optical converging means for subjecting said optical beam to a power in one direction;
   deflecting means for deflecting said optical beam for scanning; and
   an optical imaging system for imaging the deflected optical beam to form a spot on a surface to be scanned,
   the apparatus further comprising:
   a plurality of light transmitting flat plates disposed in an optical path between said optical converging means and said deflecting means; and
   variable supporting means for supporting said light transmitting flat plates so that the inclination angles of said light transmitting flat plates relative to a perpendicular plane to said optical beam may vary to change a diameter of the spot of said optical beam.

2. An optical scanning apparatus as defined in claim 1, in which said light transmitting flat plates include a pair of flat plates which are moved in opposite directions in a link motion with each other.

3. An optical scanning apparatus as defined in claim 1, in which said variable supporting means changes in any degree the inclination angles of said light transmitting flat plates relative to said optical beam.

4. An optical scanning apparatus as defined in claim 1, in which said variable supporting means changes the inclination angle of said light transmitting flat plates relative to said optical beam in substantially small steps.

5. An optical scanning apparatus as defined in claim 1, in which said light source means emits a substantially parallel optical beam.

6. An optical scanning apparatus as defined in claim 1, in which said variable supporting means includes drive means for changing the inclination angles of said light transmitting flat plates in response to an electrical signal.

7. An optical scanning apparatus as defined in claim 6, in which said drive means is capable of independently driving each of said light transmitting flat plates.

8. An optical scanning apparatus, comprising:
   light source means for emitting an optical beam;
   optical converging means for subjecting said optical beam to a power in one direction;

deflecting means for deflecting said optical beam for scanning; and an optical imaging system for imaging the deflected optical beam to form a spot on a surface to be scanned, the apparatus further comprising:

two light transmitting flat plates disposed in an optical path between said optical converging means and said deflecting means; and variable supporting means for rotatably supporting said two light transmitting flat plates in a plane in which said optical converging means has a power.

9. An optical scanning apparatus as defined in claim 8, in which said light transmitting flat plates include a pair of flat plates which are moved in opposite directions in a link motion with each other.

10. An optical scanning apparatus as defined in claim 8, in which said variable supporting means changes in any degree the inclination angles of said light transmitting flat plates relative to said optical beam.

11. An optical scanning apparatus as defined in claim 10, in which said variable supporting means changes the inclination angles of said light transmitting flat plates relative to said optical beam in substantially small steps.

12. An optical scanning apparatus as defined in claim 8, in which said light source means emits a substantially parallel optical beam.

13. An optical scanning apparatus as defined in claim 8, in which said variable supporting means includes drive means for changing the inclination angles of said light transmitting flat plates in response to an electrical signal.

14. An optical scanning apparatus as defined in claim 13, in which said drive means is capable of independently driving each of said light transmitting flat plates.

15. An optical scanning apparatus receiving a collimated optical beam for scanning an optical spot on a scanned surface comprising:

a first optical member for converging said collimated optical beam in one direction thereof to form a spot on said scanned surface;

scanning means for deflecting said optical beam to scan said spot on said scanned surface;

a plurality of second optical members for changing the distance between an axis of an incident light ray and an axis of an exiting light ray depending upon incident angles of the optical beam to the respective second optical members, said axes being held in parallel with each other; and variable supporting means for holding said second optical members in a path of the collimated beam and adjusting attitudes of said second optical members so that the position of the final exiting light ray and an optical length between a first incidence and a final exit of the optical beam can be varied to make variable a diameter of the spot formed on the scanned surface.

16. A recording apparatus for recording information onto a recording surface by scanning the recording surface with an optical beam, said recording apparatus comprising:

deflecting means for deflecting said optical beam to scan a spot on the recording surface;

signal generating means for generating a spot diameter changing signal;

a plurality of light transmitting flat plates disposed on a path of said optical beam; and variable supporting means for variably supporting said light transmitting flat plates, said variable supporting means receiving said spot diameter changing signal and changing an inclination angle of said light transmitting flat plates relative to said optical beam for changing a diameter of the spot of light corresponding to said spot diameter changing signal.

17. A recording apparatus as defined in claim 16, in which said light transmitting flat plates include a pair of flat plates which are moved in opposite directions in a link motion with each other.

18. A recording apparatus as defined in claim 16, in which said variable supporting means changes in any degree the inclination angles of said light transmitting flat plates relative to said optical beam.

19. A recording apparatus as defined in claim 16, in which said variable supporting means changes the inclination angle of said light transmitting flat plates relative to said optical beam in substantially small steps.

20. A recording apparatus having an optical member for converging a collimated optical beam in one direction to form a spot on a recording surface, the apparatus comprising:

a plurality of optical members provided in a path of the collimated optical beam for changing the distance between an axis of an incident light ray and an axis of an exiting light ray which are parallel with each other depending upon incident angles of the optical beam to the respective optical members so that the position of the final exiting light ray can be adjusted and an optical length between a first incidence and a final exit of the optical beam can be varied to make a diameter of the spot variable.

* * * * *